(12) United States Patent
Smith

(10) Patent No.: US 6,574,914 B2
(45) Date of Patent: Jun. 10, 2003

(54) FLYING INSECT TRAP

(76) Inventor: John T. Smith, 356 Waterfront, Dixon, IL (US) 61021

(*) Notice: Subject to any disclaimer, the term of this patent is extended or adjusted under 35 U.S.C. 154(b) by 0 days.

(21) Appl. No.: 10/167,846

(22) Filed: Jun. 12, 2002

(65) Prior Publication Data

US 2003/0000127 A1 Jan. 2, 2003

Related U.S. Application Data

(63) Continuation-in-part of application No. 09/829,174, filed on Apr. 9, 2001, now abandoned.

(51) Int. Cl.$^7$ .............................. A01M 1/08; A01M 1/14
(52) U.S. Cl. ................................ 43/113; 43/114; 43/139
(58) Field of Search ........................... 43/113, 114, 139

(56) References Cited

U.S. PATENT DOCUMENTS

| | | | | |
|---|---|---|---|---|
| 1,701,674 A | * | 2/1929 | Hitosi | 43/113 |
| 2,384,930 A | * | 9/1945 | Kendrick | 43/113 |
| 2,931,127 A | * | 4/1960 | Mayo | 43/113 |
| 3,058,257 A | * | 10/1962 | Brophy et al. | 43/113 |
| 3,123,933 A | * | 3/1964 | Roche | 43/113 |
| 3,305,965 A | * | 2/1967 | Cornell, III | 43/113 |
| 3,319,374 A | * | 5/1967 | Gawne | 43/113 |
| 3,336,694 A | * | 8/1967 | O'Connell | 43/113 |
| 3,348,332 A | * | 10/1967 | O'Connell et al. | 43/113 |
| 3,796,001 A | * | 3/1974 | Jackson | 43/113 |
| 3,987,578 A | * | 10/1976 | Rueff | 43/113 |
| 4,117,624 A | * | 10/1978 | Phillips | 43/113 |
| 4,127,961 A | * | 12/1978 | Phillips | 43/113 |
| 4,141,173 A | * | 2/1979 | Weimert et al. | 43/113 |
| 4,282,673 A | * | 8/1981 | Focks et al. | 43/113 |
| 4,332,100 A | * | 6/1982 | Schneider | 43/113 |
| 4,654,998 A | * | 4/1987 | Clay | 43/113 |
| 4,686,789 A | * | 8/1987 | Williams | 43/113 |
| 4,788,789 A | * | 12/1988 | Boobar et al. | 43/113 |
| 4,819,370 A | * | 4/1989 | Woodruff | 43/113 |
| 4,856,226 A | * | 8/1989 | Taylor | 43/113 |
| 5,014,460 A | * | 5/1991 | Patti et al. | 43/113 |
| 5,157,865 A | * | 10/1992 | Chang | 43/113 |
| 5,231,790 A | * | 8/1993 | Dryden et al. | 43/113 |
| 5,243,781 A | * | 9/1993 | Carter | 43/122 |
| 5,301,456 A | * | 4/1994 | Jobin et al. | 43/113 |
| 5,329,725 A | * | 7/1994 | Bible | 43/113 |
| D350,802 S | * | 9/1994 | Herbert | D22/122 |
| 5,365,690 A | * | 11/1994 | Nelson et al. | 43/113 |
| 5,461,822 A | * | 10/1995 | Green et al. | 43/122 |
| 5,513,465 A | * | 5/1996 | Demarest et al. | 43/113 |
| 5,608,987 A | * | 3/1997 | Meyer | 43/113 |
| 5,647,164 A | * | 7/1997 | Yates | 43/113 |
| 5,651,211 A | * | 7/1997 | Regan et al. | 43/113 |
| 5,992,087 A | * | 11/1999 | Chu et al. | 43/122 |
| 6,112,454 A | * | 9/2000 | Plato et al. | 43/122 |

FOREIGN PATENT DOCUMENTS

| | | | | |
|---|---|---|---|---|
| CA | 631512 B1 | * | 11/1961 | 43/139 |
| CH | 172636 B1 | * | 1/1935 | 43/139 |
| DE | 522094 B1 | * | 3/1931 | 43/113 |
| DE | 2834972 B1 | * | 2/1980 | 43/114 |
| EP | 237453 B1 | * | 9/1987 | |
| FR | 618847 B1 | * | 3/1927 | 43/139 |
| FR | 2551322 B1 | * | 3/1985 | |
| JP | 11-75657 B1 | * | 3/1999 | |
| WO | WO-97/10709 A1 | * | 3/1997 | |
| WO | WO-01/01768 A1 | * | 1/2001 | |

* cited by examiner

*Primary Examiner*—Darren W. Ark
(74) *Attorney, Agent, or Firm*—Keith Frantz (57) ABSTRACT

A flying insect trap includes an insect attracting light located in a generally translucent cover, an axial flow fan to draw the insects into the cover and to force the flying insects onto a sticky, disposable slid-in tray as the air flow impinges thereon prior to exiting laterally through exhaust ports.

9 Claims, 10 Drawing Sheets

FLYING INSECT TRAP

Cross-references to related applications—This application is a continuation-in-part of U.S. patent application Ser. No. 09/829,174, filed Apr. 9, 2001 now abandoned.

BACKGROUND OF THE INVENTION

1. Field of Invention

The present invention relates to apparatus for trapping flies and other flying insects for collection and subsequent disposal.

2. Description of Prior Art

The prior art is replete with flying insect traps of various configurations. Many of these prior flying insect traps are adapted for industrial, commercial, farming and like environments where a large number of flying insects may be encountered and collection of a large-volume of flying insects is desired. Flying insect traps of this type generally use relatively large bags or other volume storage containers for collection of the captured flying insects, and as a result are generally not suitable for personal or home use. Other prior flying insect trap arrangements are relatively complicated and corresponding expensive, and thus also not generally suitable for home or personal uses. Flying insect traps generally of the above types are shown in Mayo, U.S. Pat. No. 2,931,127; Brophy et al., U.S. Pat. No 3,058,257; Weimert et al., U.S. Pat. No. 4,141,173; and Bible, U.S. Pat. No. 5,329,725; Roche, U.S. Pat. No. 3,123,933; and Rueff, U.S. Pat. No. 3,987,578.

Certain prior flying insect traps that appear to be smaller or simpler or otherwise generally more suitable for home and personal use are shown in O'Connell, U.S. Pat. No. 3,336,694; Schneider, U.S. Pat. No. 4,332,100; Williams, U.S. Pat. No. 4,686,789; Boobar et al., U.S. Pat. No. 4,788,789; Taylor; U.S. Pat. No. 4,856,226; Patti et al., U.S. Pat. No. 5,014,460; Chang, U.S. Pat. No. 5,157,865; Jobin et al., U.S. Pat. No. 5,301,456; Meyer, U.S. Pat. No. 5,608, 987; Regan et al.; U.S. Pat. No. 5,651,211; Chu et al., U.S. Pat. No. 5,992,087; Plato et al., U.S. Pat. No. 6,112,454; and Nelson et al., U.S. Pat. No. 5,365,690. Each of these arrangements purports to solve certain aspects and problems associated with apparatus trapping, collection and disposal of flying insects prior thereto, however, each also exhibiting certain drawbacks associated therewith. Such drawbacks and disadvantages include having exposed lights and/or insect catching water or fly paper such that persons and especially smaller children are at risk of injury, and the equipment at risk of being damaged.

For example, Phillips, U.S. Pat. No. 4,117,624 discloses an insect trap that includes an exposed light and fly paper for catching flying insects. In this instance, the light is at risk of being damaged from external sources, and the sticky paper is exposed to the outside contaminating elements, reducing the useful life of the paper Carter, U.S. Pat. No. 5,243,781; Herbert, U.S. Pat. No. Des. 350,802; and Green et al., U.S. Pat. No. 5,461,822 each disclose flying insect traps that utilize a cone-shaped entry-way into a storage area. However, in each of these instances, with the storage area above the apex of the cone (i.e., outside the cone), disposal of the collected insects requires either removal of the storage unit from the cone (Herbert), or turning over the entire unit (Green and Carter), in order to dump the collected insects. Such dumping is an awkward procedure for disposing of collected insects, particularly where these apparatus includes bait to draw the flying insects upwardly through the cone. Moreover, the use of bait is generally undesirable for several reasons, including the smell often times associated therewith, and the inconvenience of having an additional component to deal with in the use of such flying insect traps. It is believed that none of these prior arrangements have achieved substantial commercial success for home or personal use due to these and other drawbacks and difficulties in the collection and disposal of flying insects.

Thus, there is a need for a new and improved flying insect trap that is suitable for home or personal use. In particular, there is a need for a flying insect trap that is relatively simple in operation and construction, does not require bate, does not present exposed lights and/or insect catching apparatus, and is adapted for ease of collection and disposal of collected flying insects.

SUMMARY OF THE INVENTION

The general aim of the present invention is to provide a new and improved flying insect trap that is portable, relatively compact, relatively simple in construction, and is adapted for safety and ease of use and disposal of collected insects.

A detailed objective of the invention is to provide a flying insect trap that includes a generally upwardly converging translucent or transparent entry-way for the insects entering the trap, but that eliminates the need to turn over the entry-way or the entire unit in order to dispose of the collected insects.

Another detailed objective of the invention is to provide an insect attracting light protectably housed in the translucent entry-way.

Another detailed objective is to provide for the use of a generally upwardly facing sticky surface that is enclosed below the entry-way for collection of insects, the insect-collection surface being generally enclosed and shielded from external contaminating elements yet easily removed and replaceable without substantially disturbing the unit.

A more detailed objective is to achieve the foregoing by providing a disposable tray adapted to be slipped into and out of position in the unit, the tray being provided with either pre-installed fly paper with a sticky film or a pre-applied layer or film of sticky adhesive material.

Another objective is to provide a fan adapted to draw flying insects into the entry-way and to direct the flying insects onto the insect-collection surface of the fly paper or the sticky film.

Yet another detailed objective of the invention is to position the disposable tray in the forced air flow path of the fan such that the insects are caught on the fly paper when the air impinges thereon prior to the air turning and exiting laterally from the trap.

Still another objective is to provide a guard positioned above the translucent entry-way to permit entry of flying insects, but sized to inhibit objects from falling into and through the entry-way.

The invention also resides in the provision of an insect-collection surface with raised mounds for enhanced insect-collection capability.

These and other objectives and advantages of the invention will become more apparent from the following detailed description when taken in conjunction with the accompanying drawings.

Briefly, a preferred flying insect trap in accordance with the invention includes a cover having translucent side portions that converge upwardly to an upper opening, an insect attracting light positioned inside the transparent side portions of the cover, a lower base section having laterally facing exhaust ports, an axial flow fan to draw the flying insects through the inlet and downwardly toward the lower base section, and a tray provided with a generally upwardly facing, insect-collection sticky surface slidably positioned in the lower base section such that the air impinges on the sticky surface, causing the flying insects to be caught thereon, prior to the air turning and exiting laterally through the exhaust ports.

Reference numerals shown in the drawings correspond to the following items discussed further below:
10 flying insect trap
14 cover
16 light bulb
18 light bulb socket
20 axial flow fan
22 fan blades
24 electrical wire
24a a electric power chord
26 inlet opening
28 electrical connection box/area
30 tray
32 lower base section
34 sides of lower base section
34a side wall of tray
36 exhaust ports
38 fly paper
40 slides/tracks to receive/support tray
42 tray bottom
44 cap
46 support legs
48 support bracket
50 alternate embodiment flying insect trap
52 support bracket
54 side walls of enclosure
56 lower end of cover
58 light bulb socket
60 mid-section enclosure
64 cover
66 nut
68 threaded stud
70 inlet opening
72 cap
74 support legs
76 tray
78 tracks
80 tray lip
82 second alternate embodiment flying insect trap
84 lower base section
86 side walls of lower base section
86a side wall of tray
88 exhaust ports
88a exhaust ports
90 tray
90a sides of tray
92 base of tray
94 tracks
96 mid-section
98 cover
100 inlet opening
102 cap
104 legs
106 support surfaces
108 hooks
110 slots
112 guides
114 adhesive mounds
116 internal walls of tray
118 sticky insect-collecting film
120 bracket While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

For purposes of illustration, one embodiment of the present invention is shown in FIGS. 1–4 as flying insect trap 10.

The flying insect trap 10 includes a base assembly comprising a lower base section 32 having generally enclosing sides provided with laterally facing exhaust openings 36. Slidably positioned in the lower base section is a tray 30 having a bottom 42 oriented cross-wise with respect to and near or below the lower portions of the exhaust ports 36. Secured to the tray bottom is a sheet of fly paper 38 with its "sticky" fly-catching side facing upwardly. In preferred embodiments, the tray and fly paper are supplied together as a disposable unit.

Figure 1:
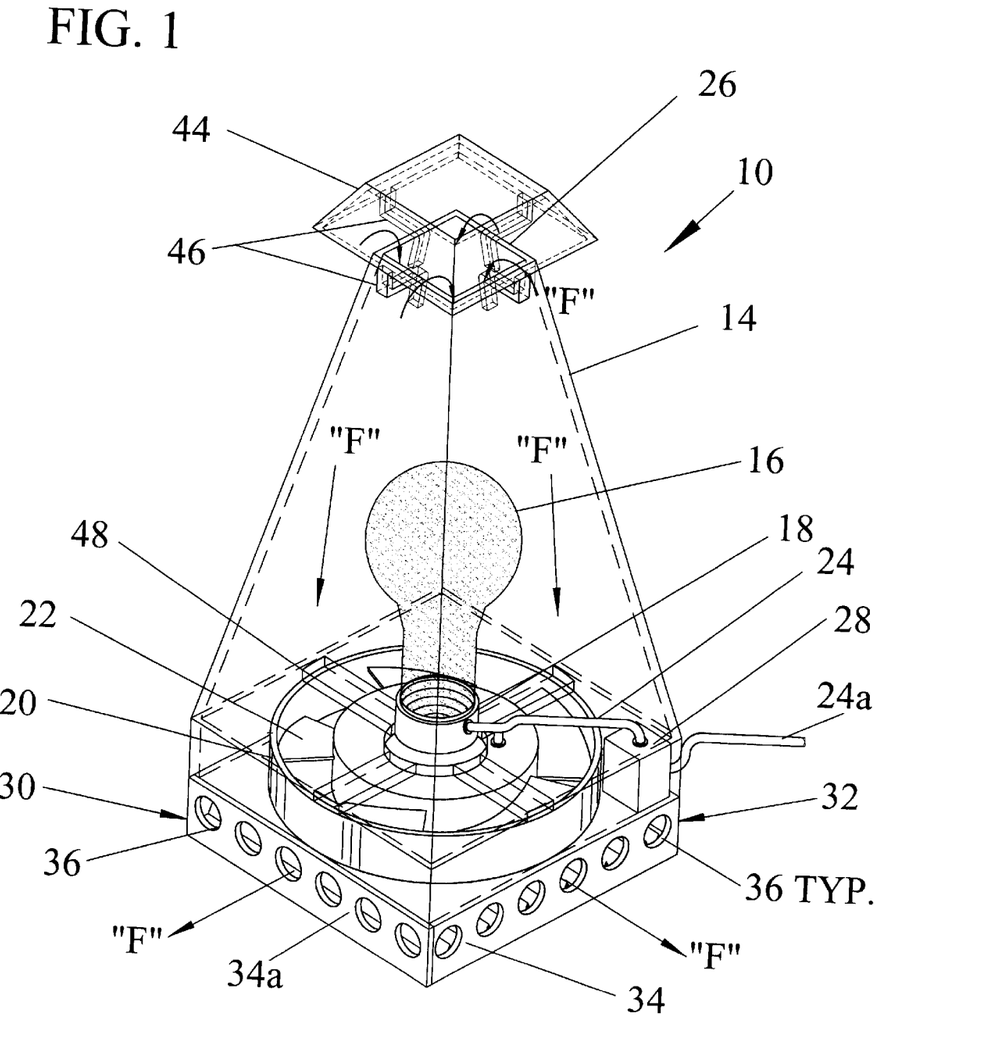
FIG. 1 is a front perspective view of one embodiment of a flying insect trap incorporating the unique aspects of the present invention.
Figure 2:
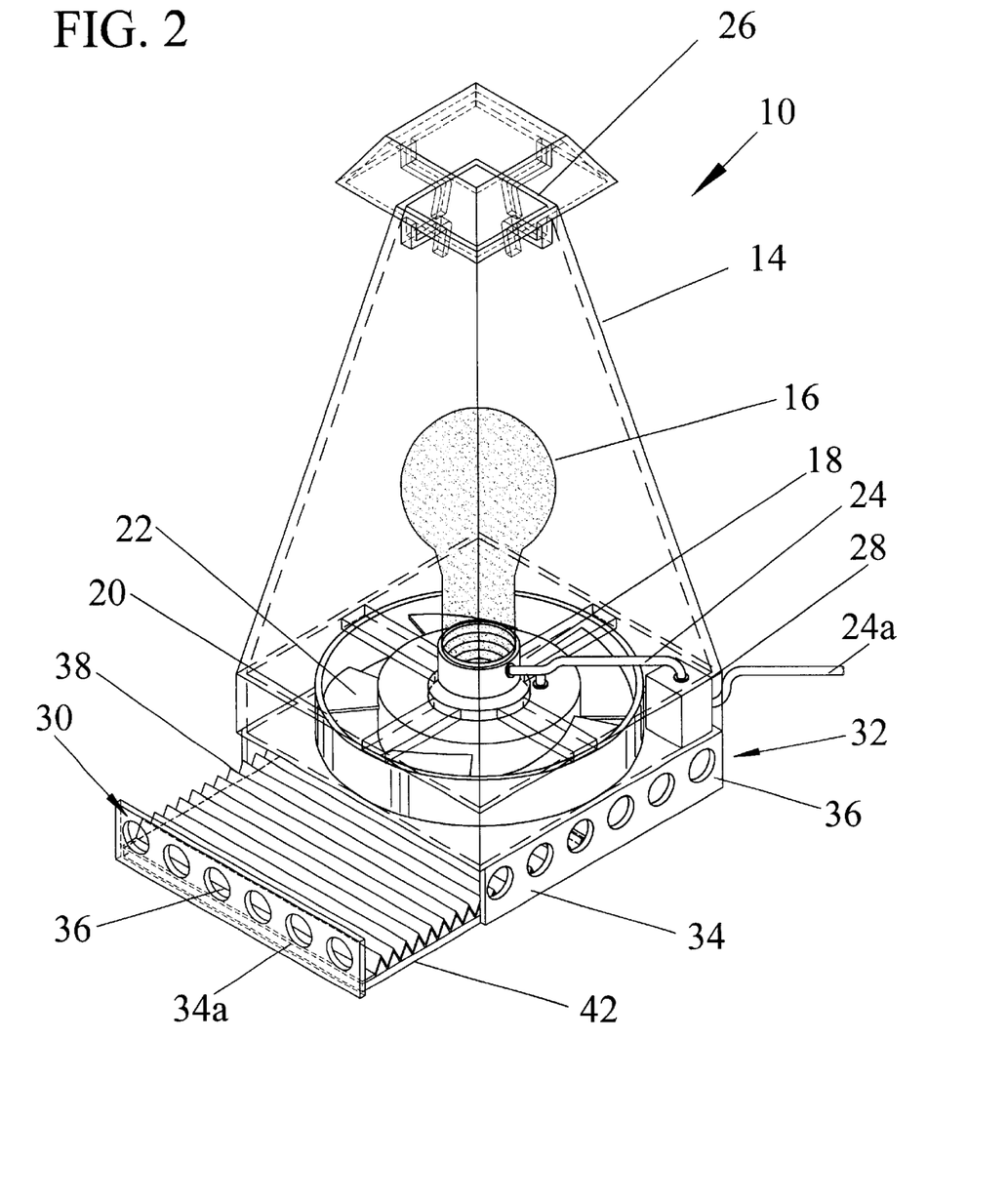
FIG. 2 is a view similar to FIG. 1 but showing the insect collection tray in a position partially installed into (or removed from) the base of the trap.
Figure 3:
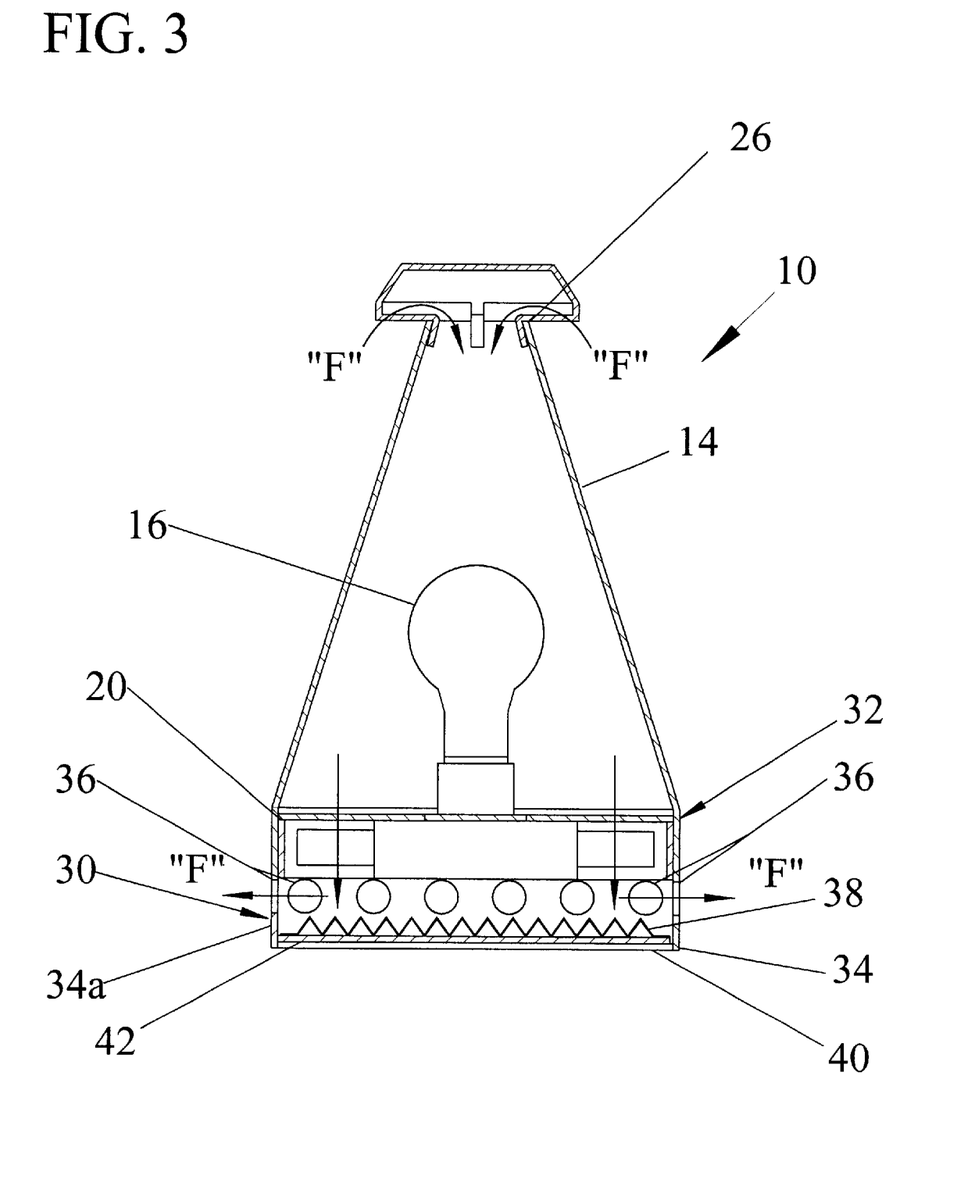
FIG. 3 is a side cross-sectional view of the fly trap of FIG. 1.
Figure 4:
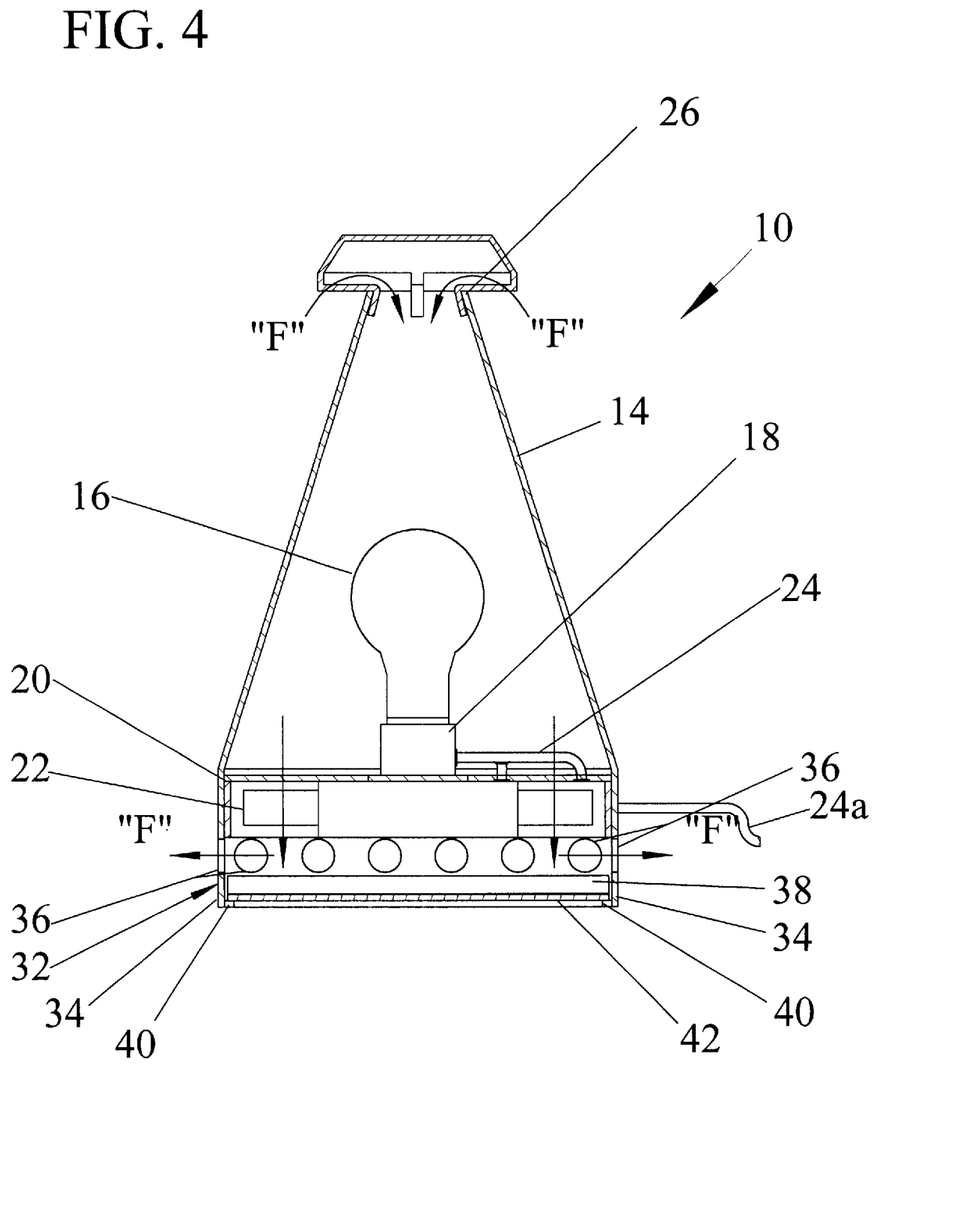
FIG. 4 is a cross-sectional view similar to FIG. 3 but taken orthogonal thereto.
Figure 5:
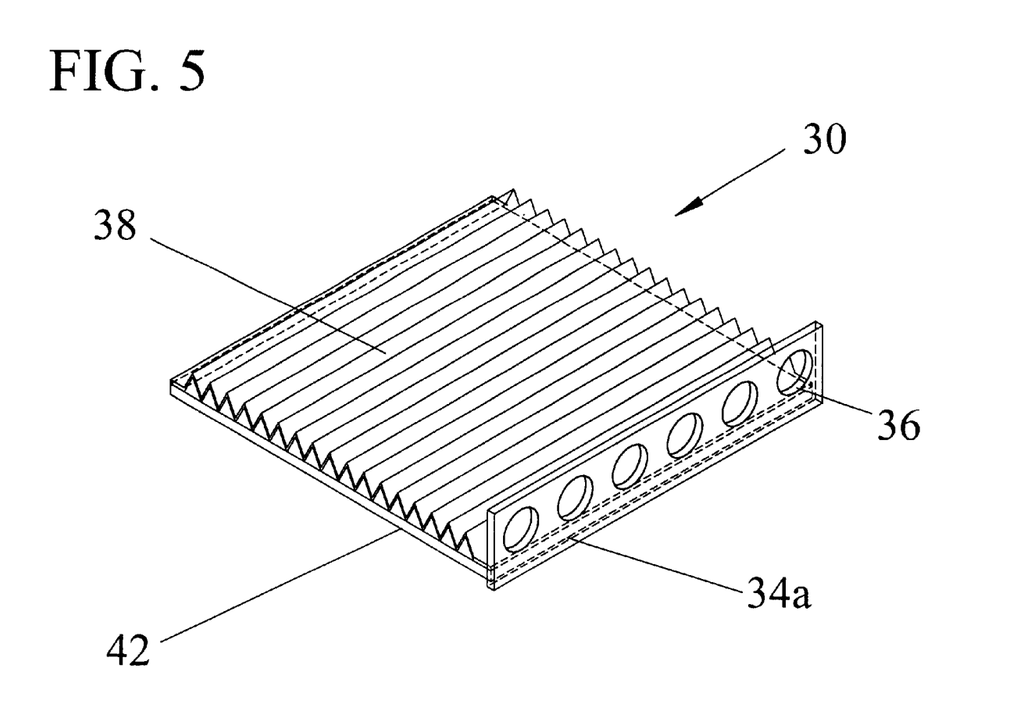
FIG. 5 is an enlarged view of the insect collection tray shown in FIGS. 2–4.

In the embodiment shown, a pair of support strips or tracks 40 (see FIGS. 3–4) extending along the inside of opposing sides 34 are sized and shaped to slidably receive and support the tray 30 such that the tray and fly paper are easily slid into and removed from the trap (see e.g., FIG. 2). This provides for ease in discarding a tray with used fly paper, and replacing it with a tray having fresh paper. The tray 30 shown includes a sidewall 34a sized and shaped to cooperate with the sidewalls 34 such that, when the tray is installed into the trap, the sidewalls 34 and 34a cooperate to define the generally enclosing sidewalls of the lower base section.

Extending upwardly from the base assembly is a cover 14 having a generally open lower end, an upper opening 26, and translucent side portions that converge upon progressing toward the opening 26. The sides of the cover define generally enclosing sidewalls that cooperate with the base section to define a substantially closed air-flow path between the upper opening 26 and the lower exhaust ports 36.

Positioned above the tray 30 is an electric motor driven axial-flow fan 20 with fan blades 22 oriented to draw air downwardly therethrough such that the fan generally creates a spiral vortex of air as it is drawn downwardly through the opening 26 and through the cover. Electrical wiring, generally designated herein as reference numeral 24, connects the fan to an external electric power supply (not shown), such as through electrical connection area 28 and an electric power cord 24*a*.

Positioned above the fan 20 and generally within the translucent side portions of the cover 14 for illumination therethrough is an electric light bulb 16 of a type suitable to attract flying insects, and an associated light bulb socket 18. Electrical wiring 24 connects the light bulb socket to the external electric power supply such as through electrical connection area 28 and the electric power cord 24*a*. In preferred embodiments, the light bulb 16 is an ultraviolet or a black light for attracting flying insects from a relatively large area surrounding the trap.

Positioned above the cover 14 via support legs 46 is a cap 44. The cap is sufficiently raised to permit the entry of flying insects through opening 26, and is sized to generally overlap the opening 26 to inhibit objects from falling into the trap. The legs 46 are, for example, permanently connected to the inside of the upper portion of the cover, or they may releasably connected thereto with suitable releasable connection configuration therebetween.

With this arrangement, the lighted bulb 16 attracts flying insects to the vicinity of the trap 10, whereupon the tapered side portions of the translucent cover 14 result in the insects migrating toward the upper end of the cover 14. Upon reaching the opening 26, the insects are drawn into the downwardly flowing air vortex and into the interior of the cover, then down through the fan 20 and forced onto the fly paper 38 as the air-flow impinges thereon prior to exiting laterally through the exhaust ports 36. The air-flow path through the trap generally indicated by the flow direction arrows identified with "F" in FIGS. 1, 3 and 4. When the fly paper is no longer effective in catching the flying insects, i.e., when the fly paper is "full", or at other convenient times, the tray 30 is simply removed from the lower base section 32 and discarded, and a tray with fresh fly paper is installed into the trap.

Figure 6:
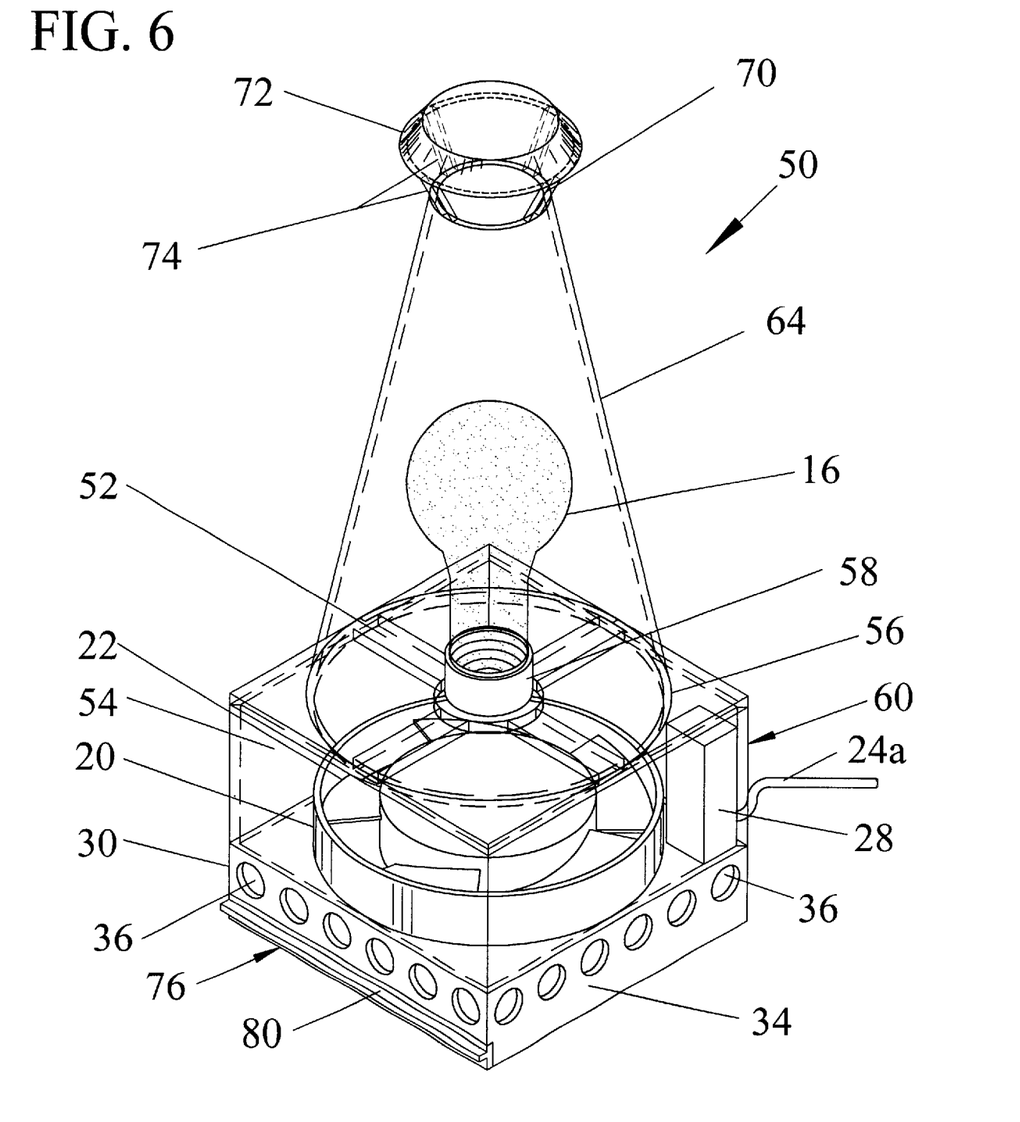
FIG. 6 is a perspective view of an alternate embodiment flying insect trap in accordance with the invention.
Figure 7:
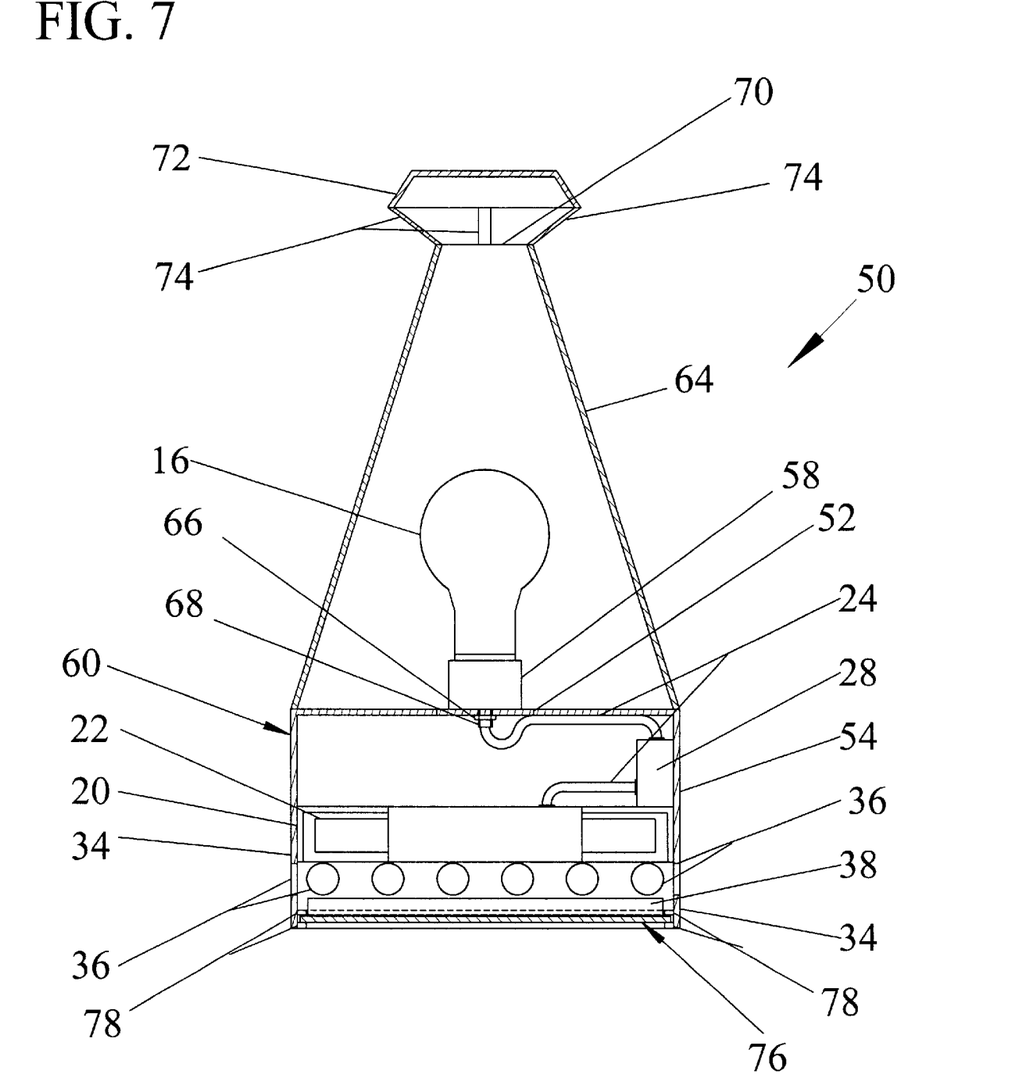
FIG. 7 is a side cross-sectional view of the flying insect trap of FIG. 6.

Those skilled in the art will recognize that alternate flying insect trap configurations and arrangements will fall within the scope of the present invention. For illustrative purposes, one alternate embodiment flying insect trap 50 is shown in the drawings in FIGS. 6–7, with the same reference numerals being used for the same items in the two embodiments, and with similar items being in accordance with the description of trap 10 above except as shown in the drawings and/or as discussed below.

The light bulb socket 18 of the trap 10 is secured directly to the fan housing, such as with adhesive, fasteners received into the housing of the fan or to a permanent bracket 48 that is part of or connected to the fan housing. Alternately, for example, the light bulb socket 58 of the trap 50 is secured such as with a rivet or tubular eyelet or a threaded hollow stud 68 and threaded nut 66 to the center of support bracket 52 that is raised above the fan housing. In this instance, (i) the trap 50 includes a mid-section enclosure 60 that extends above the height of the fan housing, that has generally open upper and lower ends, and that includes enclosing side portions 54, (ii) the support bracket 52 extends between the sides 54 of the mid-section enclosure 60, and (iii) the cover 64 is releasably connected such as at the lower end 56 thereof to mid section 60 to permit changing the light bulb 16.

The trap 10 is provided with a cover 14 having a four-sided, pyramid shaped, upwardly converging translucent sides. Alternately, the trap may be provided with a cover having other upwardly converging side configurations such as with a generally frusto-conical shaped translucent cover 64 having a round upper opening 70 as shown in the trap 50. And although the covers 14 and 64 are shown made entirely from translucent material, they may be alternately made with portions of non-translucent materials.

The tray 76 of the flying insect trap 50 is slidably positioned between vertically spaced tracks 78 extending along opposing sides 34, and is provided with a lip 80 to grab during installation and removal of the tray. In this instance, the exhaust ports 36 on the tray entrance side of the lower base section are located in the fixed sidewall thereof above the tray. And although the traps are shown provided with corrugated fly paper with mounds in the form of ridges raised from the base 42 of the tray, to provide increased insect-holding capacity, it will be understood that flat fly paper or otherwise may be alternately provided.

The trap 50 is also provided with a cap 72 positioned above the upper opening 70 to inhibit objects from falling into the trap. In this instance, the cap 72 is shown generally round (when viewed from above) to present a shape complimentary to the shape of the cover 64, and is connected to the upper end of the cover 56 with integrally molded or otherwise connected legs 74. Although the caps 44 and 72 are shown generally dome-shaped, suitable caps pursuant hereto may take any shape suitable for the purposes hereof including substantially flat and integrally molded caps.

Figure 8:
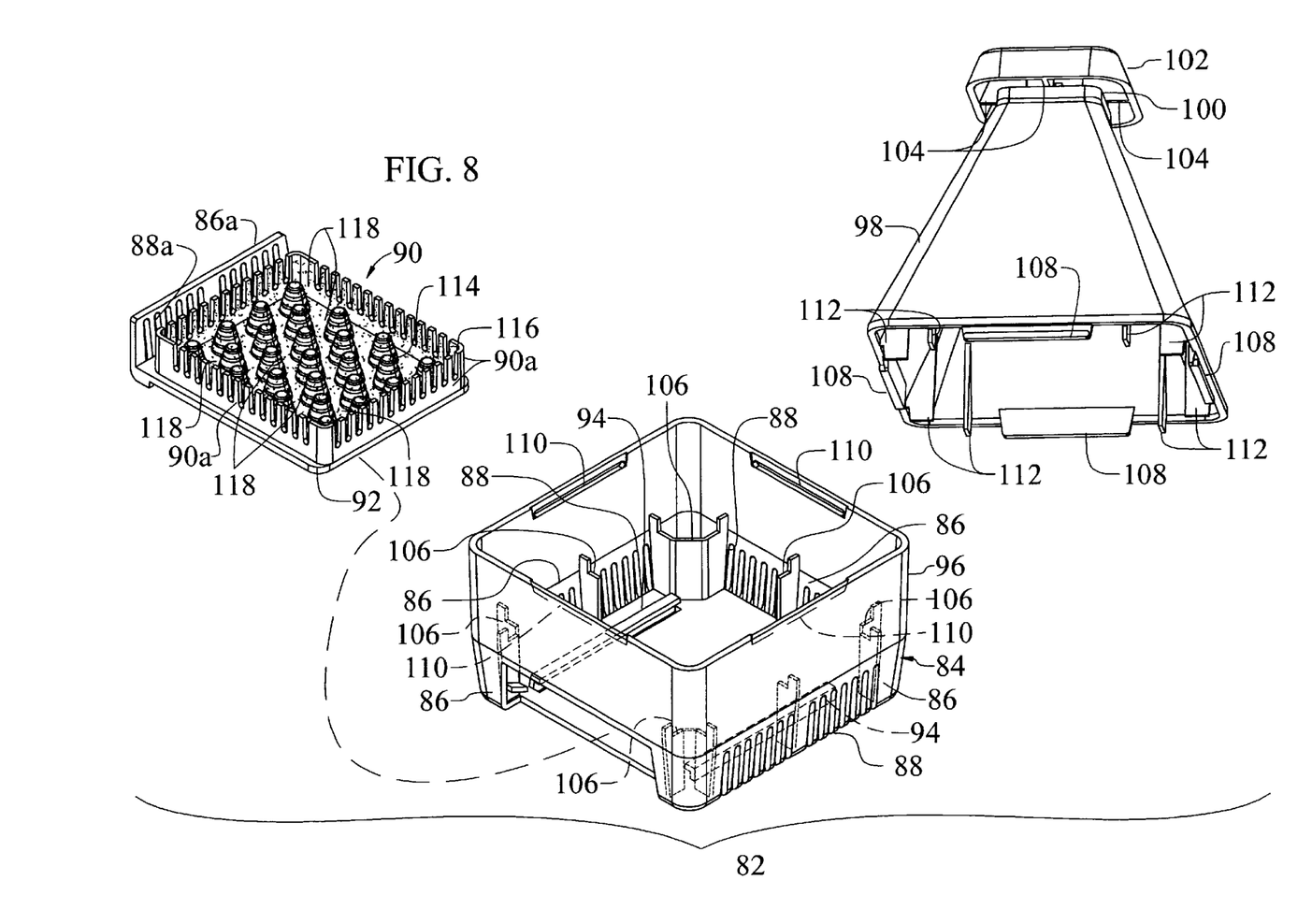
FIG. 8 is an exploded perspective view of certain parts of a second alternate, preferred embodiment flying insect trap in accordance with the invention.
Figure 9:
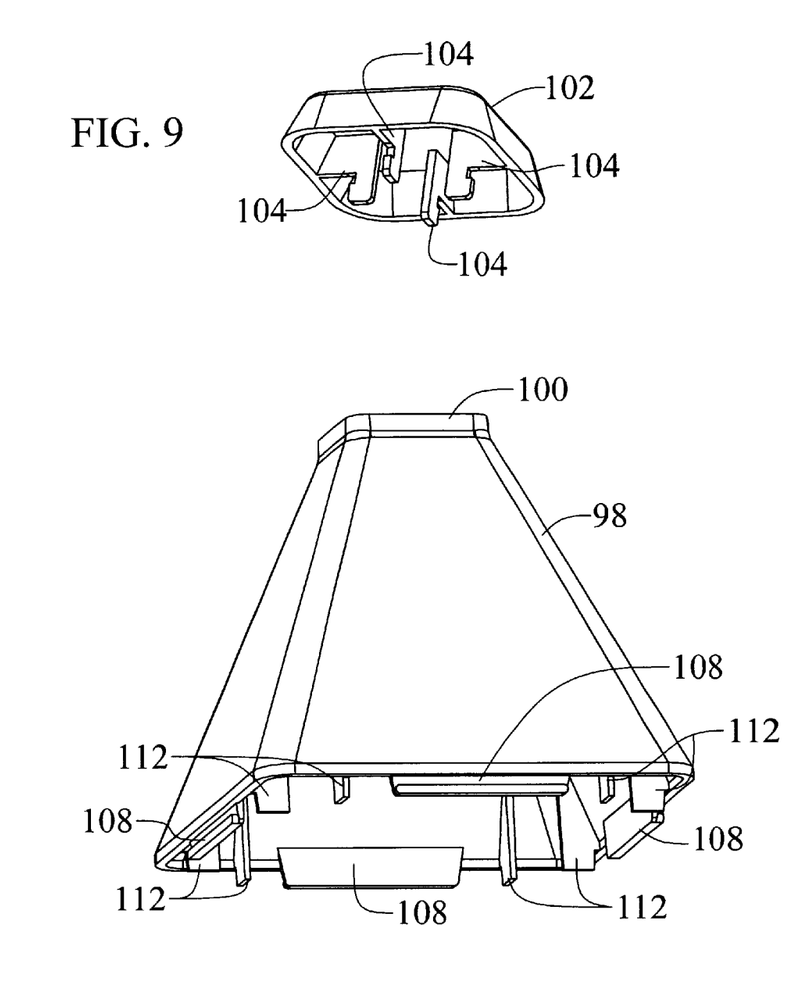
FIG. 9 is an exploded perspective view of certain parts shown in FIG. 8.

As further illustration, portions of a second alternate, preferred embodiment flying insect trap 82 is shown in the drawings in FIG. 8. The construction and operation of trap 82 is substantially similar to traps 10 and 50 described above. Thus, the trap 82 includes a lower base section 84 provided with generally enclosing sides 86 and laterally facing exhaust ports 88, a disposable tray 90 having a base 92 cross-wise with respect to the exhaust ports and an outer sidewall portion 86*a*, a pair of tracks 94 adapted to slidably receive and support the sides 90*a* of the tray, a mid-section enclosure 96, a cover 98 provided with translucent side portions that converge upon progressing upwardly toward an upper opening 100, the sides of the cover, mid-section and base cooperating to define a substantially closed air-flow path between the upper opening 100 and the lower exhaust ports 88, and a cap 102 connected at the top of the cover 98 above the upper opening 100 with legs 104.

Figure 10:
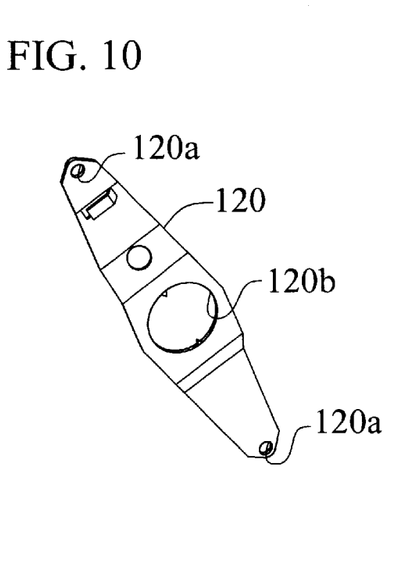
FIG. 10 is a perspective view of an alternate bracket.
Figure 11:
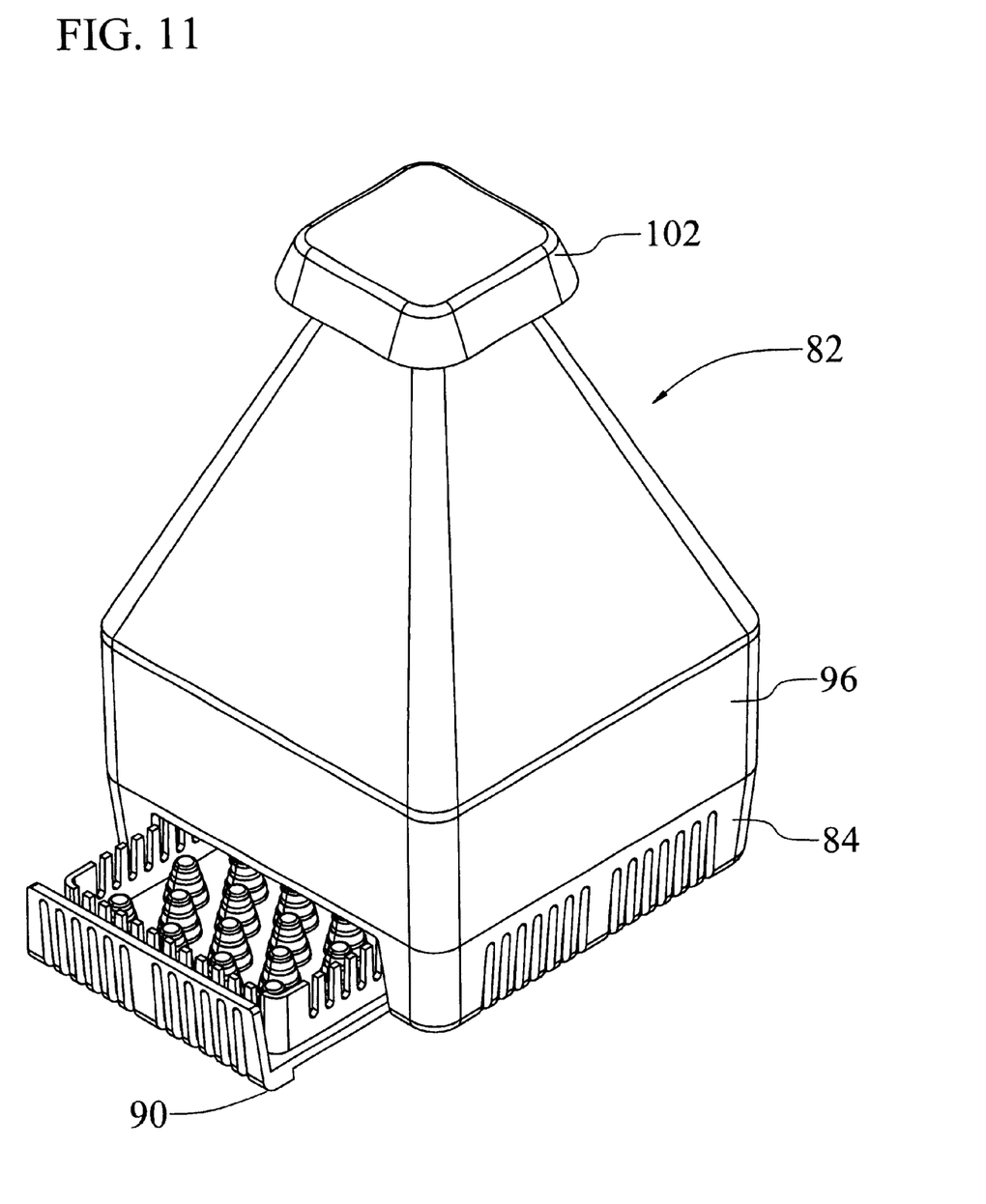
FIG. 11 is a perspective view of the second alternate embodiment, certain parts of which are shown in exploded perspective in FIGS. 8-10.

In this instance, support surfaces 106 are provided on support legs that extend upwardly from the lower base section 84 at approximately the height of the lower base section to support an electric motor driven axial-flow fan for operation as described above in connection with traps 10 and 50, an electric light bulb is suitably supported above the fan and within the mid-section for positioning of the bulb viewable through the translucent side portions of the cover, and electrical wiring is provided to power the fan and light bulb. A bracket 120 shown in FIG. 10 is another alternate arrangement suitable for riveting to the fan housing such as at the ends 120a thereof and for supporting a light bulb socket in the center 120b therein raised above the fan. The cover 98 is secured to the mid-section 96 with hooks 108 that are configured to bend resiliently inwardly as they slid over the tops of slot arrangements 110 and then snap outwardly into the slots, while being guided into position with guide posts 112.

Whereas the trays 30 and 76 of the traps 10 and 50 are provided with sticky fly paper that is preferably corrugated for increased insect-holding capacity, tray 90 is provided with spaced mounds 114 that rise upwardly from the base 92, and the upwardly exposed surface of the base 92 and the raised mounds 114 are provided with a film or layer 118 of "sticky" material to capture insects thereon. The sticky layer is pre-applied to the tray to provide for a disposable tray, such as being sprayed or brushed onto the base and raised mounds of the tray. The tray 90 is further provided with slotted walls 116 surrounding the adhesive covered mounds and exposed base portion; these walls act as an added baffle to assist in preventing insects from exiting the trap as the tray becomes filled with captured insects.

From the foregoing, it will be apparent that the present invention brings to the art a new and improved flying insect trap that is uniquely adapted to be compact and portable, and which, by virtue of the cover provided with upwardly converging side portions, an axial flow fan operative to draw flying insects into the cover through the top thereof, and a film of sticky coating on the tray transverse to the air-flow path prior to the air exiting laterally through exhaust ports, results in the flying insects impinging onto and being caught on the disposable tray. The flying insect trap is adapted for ease of disposal of collected insects by virtue of the slid-in tray arrangement, and the protected light and sticky film substantially reduce the likelihood of adverse effects from external sources as compared with prior traps having exposed sticky films and lights. As a result, the flying insect trap of the present invention provides a highly effective trap that is adapted for convenience and safety yet is simple in construction and relatively inexpensive to manufacture.

I claim:

1. A flying insect trap comprising:

a lower portion having side portions formed with laterally facing exhaust ports;

an upper portion having an upper open end and having translucent side portions that converge upon approaching said upper open end;

said upper and lower portions cooperating to define a closed air-flow path between said upper open end and said laterally facing exhaust ports;

a flying insect attracting light viewably positioned in said upper portion;

an axial flow fan positioned below said light in said closed air-flow path, the fan having an upstream side facing said upper open end and being adapted to draw air and flying insects downwardly therethrough and through said closed air-flow path; and an upwardly facing insect-catching sticky film positioned generally cross-ways in said closed air-flow path below said fan such that air drawn downwardly through said fan impinges on said film for catching insects impinging thereon prior to turning and exiting through said exhaust ports.

2. The flying insect trap as defined in claim 1 further comprising one of (i) a base and a layer of sticky material thereon providing said film, and (ii) fly paper with its sticky fly-catching side providing said film.

3. The flying insect trap as defined in claim 1 further comprising a tray slidably positioned in said lower portion and carrying said film.

4. The flying insect trap as defined in claim 3 in which the tray includes a side defining one of said side portions of said lower portion and is formed with associated laterally facing exhaust ports.

5. The flying insect trap as defined in claim 1 further comprising a cap above and generally overlying the upper open end of said upper portion.

6. A flying insect trap comprising:

a lower portion having side portions formed with laterally facing exhaust ports;

an upper portion having an upper open end and having translucent side portions that converge upon approaching said upper open end;

said upper and lower portions cooperating to define a closed air-flow path between said upper open end and said laterally facing exhaust ports;

a cap spaced above said upper open end for entry of air and flying insects therebetween and generally overlying said upper open end;

a flying insect attracting light viewably positioned in said upper portion;

an axial flow fan positioned below said light in said closed air-flow path, the fan having an upstream side facing said upper open end and being adapted to draw air and flying insects downwardly therethrough and through said closed air-flow path; and a tray slidably positioned generally cross-ways in said closed air-flow path below said fan such that air drawn downwardly through said fan impinges on said tray prior to turning and exiting through said exhaust ports, said tray being provided with an upwardly facing insect-catching sticky film for catching insects impinging thereon.

7. The flying insect trap as defined in claim 6 in which said film is provided from one of (i) a layer of sticky adhesive, and (ii) fly paper with its sticky fly-catching side providing said film.

8. The flying insect trap as defined in claim 6 in which said tray further includes raised mounds onto which the air impinges prior to turning and exiting through said exhaust ports, said raised mounds being provided with said film.

9. The flying insect trap as defined in claim 6 in which the tray includes a side defining one of said side portions of said lower portion and is formed with associated laterally facing exhaust ports.

* * * * *